No. 708,680. Patented Sept. 9, 1902.
E. E. TABOURET.
PROCESS OF MAKING DECORATIVE TILES.
(Application filed July 19, 1901.)
(No Model.)

Witnesses:

Inventor:
Emile Ernest Tabouret.
By his Attorney

UNITED STATES PATENT OFFICE.

EMILE ERNEST TABOURET, OF BRUSSELS, BELGIUM.

PROCESS OF MAKING DECORATIVE TILES.

SPECIFICATION forming part of Letters Patent No. 708,680, dated September 9, 1902.

Application filed July 19, 1901. Serial No. 68,881. (No specimens.)

*To all whom it may concern:*

Be it known that I, EMILE ERNEST TABOURET, a citizen of the Republic of France, residing at Brussels, Belgium, have invented certain new and useful Improvements in Processes of Making Decorative Tiles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to decorative designs and process of making the same, and has for its object the provision of such designs made from a body consisting of some suitable baked or unbaked ceramic materials in superposed layers.

My invention is applicable to tiles for interior and exterior decoration, signs, and similar purposes and is made from suitable ceramic materials, either of the nature of pottery requiring to be baked or from some similar materials which will solidify to a more or less extent without being baked, such as stucco and various hydraulic cements and plasters.

In carrying out my invention I provide a suitable tile made of the superposition of various colored materials, which materials are fixed in place by pressure, by firing, or by hydraulic or other adhesion.

Figure 1:
Figure 2:
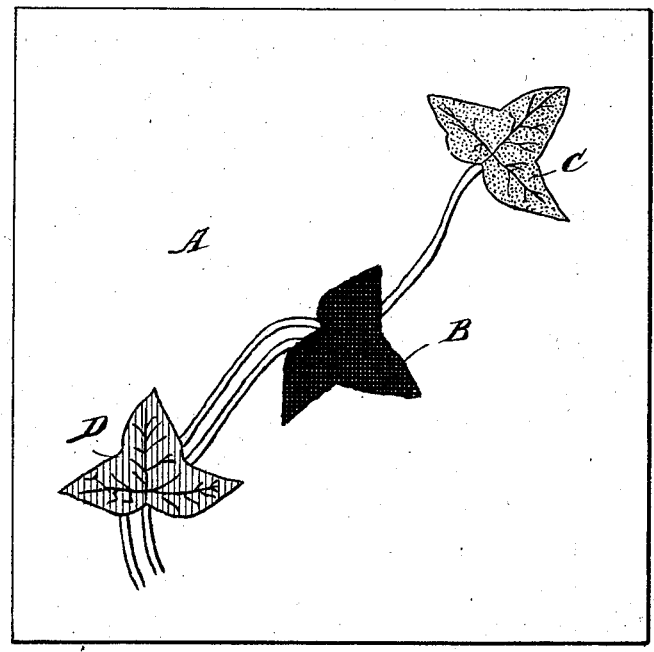

In the drawings accompanying and forming part of this specification, Figure 1 shows an edge view of a tile made according to my invention, and Fig. 2 shows a top view thereof.

The tile shown in the drawings and designated in a general way by E is in the present instance represented as comprising four layers A B C D of various-colored materials, which may be produced by means of a metal mold having the general shape and outline of tile or other object which it is desired to produce, the same having a movable bottom, into which mold the ceramic or other colors are placed in uniform layers, preferably through a sieve, one layer at a time, to a desired thickness and the surface smoothed off by a straight-edge or the like, and, if desired, in practice the bottom of the mold may be lowered as each layer is placed therein, or any other suitable means may be employed for regulating the depth of the various layers of material. After the desired number of layers have been placed in the mold the mass may be subjected to pressure to form a mass in which the respective layers adhere together. This mass may then be hardened by firing or some other means, as desired, after which the tile or other article is taken and the various layers cut away to reveal the colors of the layers below and in this wise form variegated patterns or designs thereon.

In Fig. 2 of the drawings is represented an ivy-vine wherein the colors of the leaves are made, respectively, from the layers B, C, and D and the groundwork from the layer A.

In practice it may be found desirable to make the various layers of about one millimeter in thickness, which will produce when cut designs without disfiguration, or what is commonly called "steps."

I preferably spread the powdered materials of different colors one upon the other in layers by means of a sieve or other device, so as to obtain uniformity of depth of the layers and also by which to prevent the materials of the layers from having mixed therewith coarse or lumpy particles, which would impair the refined constituency of the layers, as well as seriously interfere with the subsequent step of cutting away or removing portions of the layers for effecting well-defined reproductions of designs on the tiles. This step may be stated to constitute practically the first or initial step of my improved process and is a very important one to be considered in the practice of my invention, since in the step of uniting the layers a more perfect union is had, directly due to such first-named or initial step.

Having described my invention, I claim—

1. The process herein described of making decorative tiles, which consists in sifting powdered materials of different colors one upon the other in layers, then uniting the layers by pressure, and finally removing parts of outermost layers to varying depths at different places in reproduction of different portions of any suitable design in any of the colors of the different layers of which the tile may be constituted.

2. The process herein described of making decorative tiles, which consists in sifting powdered materials of different colors one upon the other in layers, then uniting the layers and hardening the materials, and finally removing parts of outermost layers to varying depths at different places in reproduction of different portions of any suitable design in any of the colors of the different layers of which the design may be constituted.

3. The process herein described of making decorative tiles, which consists in sifting powdered materials of different colors one upon the other in layers, then uniting the layers and firing the mass to harden the same, and finally removing parts of outermost layers to varying depths at different places in reproduction of different portions of any suitable design in any of the colors of the different layers of which the tile may be constituted.

4. The process herein described of making decorative tiles, which consists in sifting powdered materials of different colors one upon the other in layers, then uniting the mass by pressure and hardening the same, and finally removing parts of outermost layers to varying depths at different places in reproduction of different portions of any suitable design in any of the colors of the different layers of which the tile may be constituted.

5. The process herein described of making decorative tiles, which consists in sifting powdered materials of different colors one upon the other in layers, then uniting the mass by pressure and hardening the same by firing, and finally removing parts of outermost layers to varying depths at different places in reproduction of different portions of any suitable design in any of the colors of the different layers of which the tile may be constituted.

6. The process herein described of making decorative tiles, which consists in sifting powdered materials of different colors one upon the other in layers, then uniting and hardening the mass, and finally removing parts of outermost layers to varying depths at different places in reproduction of different portions of any suitable design in any of the colors of the different layers of which the tile may be constituted.

In testimony that I claim the foregoing as my invention I have signed my name in presence of two subscribing witnesses.

EMILE ERNEST TABOURET.

Witnesses:
    HENRI RACLOT,
    CÉLESTIN VERTOMMEN.